United States Patent [19]

Oppenlaender et al.

[11] Patent Number: 5,145,948
[45] Date of Patent: Sep. 8, 1992

[54] PREPARATION OF HIGHLY VISCOUS ADDUCTS OF BUTYLENE OXIDE WITH ALCOHOLS

[76] Inventors: Knut Oppenlaender, 23 Otto-Dillstrasse, 6700 Ludwigshafen; Roland Schwen, 7 Im Schlossgarten, 6701 Friedelsheim; Richard Baur, 1 Nelkenstrasse, 6704 Mutterstadt; Charalampos Gousetis, 98 Carl-Bosch-Strasse, 6700 Ludwigshafen; Juergen Mohr, 48 Hochgewanne, 6719 Gruenstadt; Helmut Mach, 43 Kaiserstrasse, 6900 Heidelberg, all of Fed. Rep. of Germany

[21] Appl. No.: 731,216

[22] Filed: Jun. 26, 1991

Related U.S. Application Data

[63] Continuation-in-part of Ser. No. 449,010, Dec. 12, 1984, Pat. No. 5,053,154.

[30] Foreign Application Priority Data

Dec. 29, 1988 [DE] Fed. Rep. of Germany ....... 3844222

[51] Int. Cl.$^5$ .................................. C08G 59/00
[52] U.S. Cl. .................. 528/409; 252/52 A; 568/606
[58] Field of Search ............. 252/52 A; 528/409, 606

[56] References Cited

U.S. PATENT DOCUMENTS

| | | | |
|---|---|---|---|
| 2,372,366 | 3/1945 | Groote et al. | 260/399 |
| 2,782,240 | 2/1957 | Hefner et al. | 260/613 |
| 3,829,505 | 8/1974 | Herold | 252/52 A |
| 4,701,520 | 10/1987 | Irving | 528/412 |
| 4,707,535 | 11/1987 | Koleske | 528/412 |

OTHER PUBLICATIONS

Database WPIL, AN 81-39143D, Derwent Abstract of JP 56-38351; Apr. 13, 1981.

*Primary Examiner*—Jacqueline Howard
*Attorney, Agent, or Firm*—Keil & Weinkauf

[57] ABSTRACT

Highly viscous adducts of 1,2-butylene oxide with secondary or primary alcohols are prepared in the presence of an alkali as a catalyst.

5 Claims, No Drawings

PREPARATION OF HIGHLY VISCOUS ADDUCTS OF BUTYLENE OXIDE WITH ALCOHOLS

This application is a continuation-in-part of the U.S. patent application Ser. No. 07/449,010, filed Dec. 12, 1989, now U.S. Pat. No. 5,053,154.

The present invention relates to a process for the preparation of highly viscous adducts of 1,2-butylene oxide with secondary or primary alcohols.

Adducts of alkylene oxides with alcohols have long been known. Adducts of ethylene oxide and/or propylene oxide with alcohols, for example glycols, are mainly described. Such adducts and also derivatives thereof are described as, inter alia, lubricant components. Thus, German Laid-Open Application DOS 1,444,840 discloses lubricants in which one component consists of an oxyalkylation product of an aliphatic alcohol or derivatives thereof. These oxyalkylation products are prepared by an addition reaction of up to 20 moles of ethylene oxide or propylene oxide with alcohols in the presence of KOH at from 110° to 140° C. However, because of the resulting low molecular weights when used in lubricants, these adducts have disadvantages with regard to the viscosity. Moreover, the ethylene and propylene adducts have inadequate oil solubility, particularly at low temperatures. U.S. Pat. No. 3,829,505 discloses polyethers and processes for their preparation. The polyethers described there, likewise adducts of alkylene oxides with, inter alia, alcohols, are also intended for lubricants an are supposed to have, inter alia, a certain molecular weight. Very special metal cyanide complex catalysts are required for their preparation. It is stated in this publication that molecular weights higher than 4,000 cannot be obtained using KOH as a catalyst.

It is an object of the present invention to provide a process which permits the preparation of highly viscous, oil soluble adducts of alkylene oxides with alcohols without the use of complex catalysts which are difficult to prepare.

We have found that this object is achieved by a process for the preparation of highly viscous adducts of 1,2-butylene oxide with secondary or primary alcohols, wherein the alcohols, as initiators, are reacted with 1,2-butylene oxide in the presence of an alkali, as a catalyst, at elevated temperatures in a molar ratio of 1,2-butylene oxide to initiator alcohol of more than 55:1, so that adducts having a molecular weight of >4,000 are formed.

It was surprising that 1,2-butylene oxide could be reacted with an alkali in a simple manner to give the adducts to be produced according to the invention, since U.S. Pat. No. 3,829,505, column 2, lines 26–28, discloses that 1,2-butylene oxide cannot be reacted with alcohols in the presence of KOH to give relatively high molecular weight adducts.

Examples of suitable alcohols are secondary and, preferably, primary alcohols of the general formula $R_1$—OH, where $R_1$ is alkyl of 1 to 36, preferably 4 to 24, in particular 6 to 20, carbon atoms. Examples of suitable alcohols are methanol, ethanol, propanol, butanol, pentanol, hexanol, octanol, decyl alcohol, lauryl alcohol, isotridecanol, myristyl alcohol, cetyl alcohol and stearyl alcohol.

The adducts, to be produced according to the invention, of 1,2-butylene oxide with alcohols are advantageously prepared by reacting an alcohol, as an initiator, with 1,2-butylene oxide in the presence of an alkali, such as sodium hydroxide solution, potassium hydroxide solution, sodium methylate, potassium methylate or another alkali metal alkoxylate, such as a sodium or potassium alkoxylate of an aliphatic alcohol of 2 to 5 carbon atoms, for example sodium tert-butylate or potassium tert-butylate, preferably potassium hydroxide solution, at from 100° to 160° C., preferably from 130° to 150° C., in particular from 140° to 150° C., to give the adduct. The molar ratio of 1,2-butylene oxide to the initiator alcohol is in general higher than 55:1, preferably from 700:1 to 60:1.

The adducts to be produced according to the invention may be employed in lubricants individually or as a mixture with one another. The lubricant may also contain other components, for example conventional components, such as base oils based on mineral oil or other synthetic lubricant components, for example poly-α-olefins.

The said lubricants are used, for example, for gears of automobile engines, automotive gears with manual shift and automatic gears or as industrial lubricants.

Lubricants having high viscosities, for example ISO-VG values (kinematic viscosity at 40° C. in $mm^2s^{-1}$) of 1,500, can be obtained with the adducts, to be produced according to the invention, of 1,2-butylene oxide with the alcohols. This is surprising since it is only possible to obtain lubricants having ISO-VG values of not more than 460 with corresponding adducts of propylene oxide with alcohols.

The Examples which follow illustrate the invention.

EXAMPLES OF PREPARATION

1. Preparation of the adducts of 1,2-butylene oxide with alcohols

A dehydrated mixture of the alcohol used as the initiator and KOH is initially taken in a pressure vessel, the amount of KOH used being about 0.01–1, preferably 0.05–0.5, e.g. 0.1, % by weight of the expected total weight of the reaction product. The vessel is flushed several times with nitrogen and heated to 140°–150° C., after which the 1,2-butylene oxide is fed in continuously or batchwise with stirring, at constant temperature and under from 5 to 30 bar, via a dip tube or onto the surface, until the desired viscosity is reached. Volatile constituents are removed, advantageously under reduced pressure, and, if necessary, the product is clarified by filtration.

2. The following 1,2-butylene oxide adducts were obtained according to Preparation Example 1:

| Product 1,2-Butylene oxide with | Viscosity at | | | VI | Moles BO |
|---|---|---|---|---|---|
| | −20° C. | +40° C. | +100° C. | | |
| A isotridecanol | 314000 | 1500 | 160 | 225 | |
| B n-octanol | 86000 | 465 | 52 | 176 | 78 |
| C n-hexanol | 130000 | 675 | 75 | 192 | 160 |
| D cetyl alcohol | 310000 | 1500 | 160 | 225 | 600 |
| E 2-ethylhexanol | 140000 | 670 | 71 | 183 | 120 |
| F tridecanol | 200000 | 950 | 105 | 207 | 250 |
| G tridecanol | 120000 | 580 | 56 | 161 | 80 |
| H bisphenol A | Pour point −15° C. | 1250 | 130 | 211 | 300 |

In commercial neutral oils, all adducts show good solubility even above the cloud points of these mineral oils.

We claim:

1. A process for the preparation of a highly viscous adduct of 1,2-butylene oxide with a secondary or primary alcohol, wherein the alcohol, as an initiator, is reacted with 1,2-butylene oxide in the presence of an alkali, as a catalyst, at elevated temperatures in a molar ratio of 1,2-butylene oxide to initiator alcohol of more than 55:1, so that an adduct having a molecular weight of >4,000 is formed.

2. A method as claimed in claim 1, wherein the alcohol is of the formula $R_2$—OH, where $R_1$ is alkyl of 1 to 36 carbon atoms.

3. A method as claimed in claim 2, wherein the initiator alcohol used is isotridecanol.

4. A method as claimed in claim 1, wherein the ratio of 1,2-butylene oxide to initiator alcohol is from 60:1 to 700:1.

5. A method as claimed in claim 1, wherein the temperature during the reaction is 100°–160° C.

* * * * *

UNITED STATES PATENT AND TRADEMARK OFFICE
CERTIFICATE OF CORRECTION

PATENT NO. : 5,145,948
DATED : September 8, 1992
INVENTOR(S) : OPPENLAENDER et al.

It is certified that error appears in the above-identified patent and that said Letters Patent is hereby corrected as shown below:

<u>Claim 2, Column 4, Line 2</u>

"formula $R_2$" should read -- formula $R_1$ --.

Signed and Sealed this

Seventh Day of September, 1993

Attest:

BRUCE LEHMAN

Attesting Officer    *Commissioner of Patents and Trademarks*